US012221796B2

(12) United States Patent
Xie et al.

(10) Patent No.: US 12,221,796 B2
(45) Date of Patent: Feb. 11, 2025

(54) BOOM, BOOM ASSEMBLY AND WORK MACHINE

(71) Applicant: SANY AUTOMOBILE MANUFACTURING CO., LTD., Hunan (CN)

(72) Inventors: Shihui Xie, Hunan (CN); Jiangbo Li, Hunan (CN); Xi Guo, Hunan (CN)

(73) Assignee: SANY AUTOMOBILE MANUFACTURING CO., LTD., Hunan (CN)

( * ) Notice: Subject to any disclaimer, the term of this patent is extended or adjusted under 35 U.S.C. 154(b) by 0 days.

(21) Appl. No.: 17/928,729

(22) PCT Filed: Aug. 24, 2020

(86) PCT No.: PCT/CN2020/110710
§ 371 (c)(1),
(2) Date: Nov. 30, 2022

(87) PCT Pub. No.: WO2022/011783
PCT Pub. Date: Jan. 20, 2022

(65) Prior Publication Data

US 2023/0279679 A1 Sep. 7, 2023

(30) Foreign Application Priority Data

Jul. 14, 2020 (CN) ......................... 202010672733.5
Jul. 14, 2020 (CN) ......................... 202021373778.4

(51) Int. Cl.
*E04G 21/04* (2006.01)
*B66C 23/64* (2006.01)

(52) U.S. Cl.
CPC .......... *E04G 21/0445* (2013.01); *B66C 23/64* (2013.01); *E04G 21/0436* (2013.01)

(58) Field of Classification Search
CPC . E04G 21/04; E04G 21/0445; E04G 21/0436; B66C 23/64
See application file for complete search history.

(56) References Cited

U.S. PATENT DOCUMENTS 3,789,869 A 2/1974 Morris
9,033,165 B2 5/2015 Aus et al.
2011/0272378 A1 11/2011 Paschke

FOREIGN PATENT DOCUMENTS

CN 102535857 A 7/2012
CN 103410326 A 11/2013
(Continued)

OTHER PUBLICATIONS

CN 202010672733.5 first office action dated Oct. 30, 2024.

*Primary Examiner* — Tan Le
(74) *Attorney, Agent, or Firm* — IPro, PLLC

(57) ABSTRACT

The present disclosure provides a boom, a boom assembly and a work machine. The work machine comprises a boom support structure and the boom assembly connected to the boom support structure, wherein the boom assembly comprises a plurality of first booms hinged to one another, at least one of the first boom is the boom, the boom has a box-type structure and comprises a body comprising a first body portion and a second body portion, the first body portion and the second body portion overlapping each other to enclose and form the box-type structure. The boom can be designed to have a light weight, and a split-type design facilitates simplifying a mold, improving the versatility of a mold, alleviating the inconsistent of thermal deformation of the boom, and facilitating later maintenance.

8 Claims, 6 Drawing Sheets

(56) References Cited

FOREIGN PATENT DOCUMENTS

| | | | | | |
|---|---|---|---|---|---|
| CN | 103711313 | A | | 4/2014 | |
| CN | 204024064 | U | | 12/2014 | |
| CN | 209161340 | U | * | 7/2019 | ............. B66C 23/42 |
| CN | 212453677 | U | | 2/2021 | |
| CN | 212656571 | U | * | 3/2021 | |
| DE | 102013225228 | A1 | | 6/2015 | |
| DE | 102014224462 | A1 | | 6/2016 | |
| DE | 102017223240 | A1 | * | 6/2019 | ............. B66C 23/54 |
| GB | 2403172 | A | | 12/2004 | |

* cited by examiner

BOOM, BOOM ASSEMBLY AND WORK MACHINE

This application claims priority to Chinese Patent Application No. 2020106727335 filed with China National Intellectual Property Administration on Jul. 14, 2020 and entitled "Boom, Boom Assembly and Work Machine", and claims priority to Chinese Patent Application No. 2020213737784 filed with China National Intellectual Property Administration on Jul. 14, 2020 and entitled "Boom, Boom Assembly and Work Machine", the entire contents of which are herein incorporated by reference.

FIELD

The present disclosure relates to the technical field of mechanical equipment, and in particular relates to a boom, a boom assembly and a work machine.

BACKGROUND

At present, the boom of concrete pump truck is mostly steel structure which is not conducive to lightweight design, and the length of the boom is close to the limit. The research on lightweight boom is mainly based on carbon fiber composite and aluminum alloy, but at present, the research on both is mainly based on single material integral molding, such as pure carbon fiber composite boom and carbon fiber foam sandwich composite boom. However, for the boom formed by single material, the mold is complex, the investment time for prophase process validation is long, the efficiency is low, and the commonality of the mold is not good. Each structural optimization requires a new adjustment of the mold, which is not conducive to batch production, and the boom can only be replaced in its entirety once it is knocked, resulting in a large waste of material.

There are also some booms using composite structure, but because of the complex forces on the large and small heads of the boom and the cylinder seat structure, and the large difference in the coefficient of thermal expansion of different materials in the composite structure. In the case of large temperature differences in the working environment, thermal deformation inconsistencies will occur, resulting in pre-stress in the boom body, and in serious cases the boom body may even bulge.

SUMMARY

The embodiments according to the present disclosure aims to solve at least one of the technical problems existing in the prior art or related art.

In view of this, one purpose of embodiments according to the present disclosure is to provide a boom.

Another purpose of embodiments according to the present disclosure is to provide a boom assembly.

Another purpose of embodiments according to the present disclosure is to provide a work machine.

In order to achieve the above-mentioned purpose, an embodiment of the first aspect of the present disclosure provides a boom, comprising a box-type structure, wherein the boom comprises: a body comprising a first body portion and a second body portion, the first body portion and the second body portion enclosing to form the box-type structure, wherein, the first body portion and the second body portion overlap each other.

In this embodiment, the first body portion and the second body portion overlap each other, that is, the first body portion and the second body portion are of a split structure. The two are connected together in an overlapping manner, the first body portion and the second body portion may be formed separately and then assembled together. The split structure is beneficial to greatly simplify the mold for production and improve the versatility of the mold. When the structure of boom is changed, it is not necessary to adjust the mold every time, which is beneficial to shorten the development time and improve the production efficiency in the early stage, and facilitate the batch production of the boom. In addition, when damage such as knock occurs to one of the first body portion and the second body portion using the split structure, only one of the damaged body needs to be replaced, and not all of the body needs to be replaced, which is advantageous in saving materials and reducing waste.

Furthermore, the first body portion and the second body portion overlap each other, which is advantageous in that they can be fixed by means of mechanical connection or the like without heat processing. That is, when the first body portion and the second body portion are fixedly connected to each other, there is no thermal processing, and it is advantageous to reduce thermal deformation or high-temperature damage of both. Therefore, the first body portion and the second body portion can use a relatively light and thin structure corresponding to the connection mode of the non-thermal processing, thereby facilitating the weight reduction of the boom and achieving the purpose of light weight reduction of the boom. The overlapping manner also allows the first body portion and the second body portion to have a small amount of inconsistent deformation, that is, different material bodies can be used for the first body portion and the second body portion, which is beneficial to improve the convenience of material selection for the first body portion and the second body portion.

In the above-mentioned embodiment, the first body portion comprises a first horizontal plate, a first side plate and a second side plate which are integrally formed, the first side plate and the second side plate are respectively located at two sides of the first horizontal plate, the first side plate, the first horizontal plate, and the second side plate form a U-shaped structure, and the second body portion comprises a second horizontal plate, a third side plate and a fourth side plate which are integrally formed, the third side plate and the fourth side plate are respectively located at two sides of the second horizontal plate, and the third side plate, the second horizontal plate and the fourth side plate form a U-shaped structure, wherein, the first side plate and the third side plate overlap each other, the second side plate and the fourth side plate overlap each other.

In the above-mentioned embodiment, the first body portion comprises a first horizontal plate, a first side plate and a second side plate, and the body portion comprises a second horizontal plate, a third side plate and a fourth side plate, which are simple in structure and easy to overlap. The first body portion and the second body portion are integrally formed respectively, which is advantageous in ensuring the strength of the first body portion and the second body portion, simplifying the process, and improving the installation speed. The first body portion and the second body portion are respectively U-shaped and are conveniently overlapped.

In the above-mentioned embodiment, at least one of the first side plate and the third side plate is provided with a limiting portion; and/or at least one of the second side plate and the fourth side plate is provided with a limiting portion, the first body portion and the second body portion are abutted via the limiting portion.

In this embodiment, the first body portion and the second body portion are abutted via the limiting portion so that the overlapping length of the two can be stably and reliably limited. That is, when overlapping is performed, the overlapping length of the two is fixed by the limiting action of the limiting portion, and at which position the limiting portion is set, the overlapping length can be brought to which position. The limiting portion can also play a role of positioning. When the first body portion and the second body portion are connected by bolting, riveting, etc., positioning is performed through the limiting portion, so as to facilitate the alignment of hole positions and save assembly time. In addition, the limiting portion can also reduce the shearing force on the first body portion and the second body portion, so as to improve the stability and reliability of both operations.

It is understood that the above-mentioned object can be achieved by providing only one of the first side plate, the second side plate, the third side plate and the fourth side plate with a limiting portion.

In the above-mentioned embodiment, the third side plate and the fourth side plate are respectively provided with the limiting portion, and the limiting portion comprises an overlapping step and an overlapping plate, the overlapping step of the third side plate abuts the first side plate, the overlapping step of the fourth side plate abuts the second side plate, the overlapping plate of the third side plate and the first side plate overlap each other, and the overlapping plate of the fourth side plate and the second side plate overlap each other; and/or the second side plate and the third side plate are provided with the limiting portion, the limiting portion comprises an overlapping step and an overlapping plate, the overlapping step of the third side plate abuts the first side plate, the overlapping step of the second side plate abuts the fourth side plate, the overlapping plate of the third side plate and the first side plate overlap each other and the overlapping plate of the second side plate and the fourth side plate overlap each other.

In this embodiment, the limiting portion comprises an overlapping step and an overlapping plate, so that the overlapped side plate can abut against each other via the overlapping step, thereby achieving the limitation of the overlapping length, and also achieving mutual support between the first body portion and the second body portion. The overlapping plate of the limiting portion facilitates overlap with adjacent side plates to facilitate mechanical connection and adhesive connection between two adjacent side plates, that is, the first body portion and the second body portion can be connected together without the need for thermal processing.

Furthermore, the third side plate and the fourth side plate are provided with a limiting portion, that is, both sides of the second body portion are provided with a limiting portion, which is beneficial to make the structure symmetrical and the first body portion and the second body portion uniformly stressed. The second side plate and the third side plate are provided with a limiting portion respectively, that is, one side of the first body portion is provided with a limiting portion, which makes the structure symmetrical, saves materials and simplifies the structure. The second body portion and the first body portion are similar in structure, have similar or identical technical effects and the description thereof will not be repeated here.

In any one of the above-mentioned embodiments, the first body portion and the second body portion are mechanically connected and bonded, and at least the first body portion is a carbon fiber material body.

In this embodiment, the first body portion and the second body portion are mechanically connected and bonded, and such a connection manner does not require heating; when connecting and fixing, there is no high temperature, and the first connecting portion and the second connecting portion are not thermally deformed, which is advantageous for the first body portion and the second body portion to use a relatively light and thin structure, thereby achieving the purpose of light weight of the body. Furthermore, the simultaneous use of mechanical connection and adhesive connection can achieve the purpose of being removable between the first connecting portion and the second body portion, so that in case of damage, it is easy to replace and maintain, avoiding the replacement of all the body, which is beneficial to saving materials. The simultaneous use of mechanical connection and adhesive connection can also help to improve the connection strength between the first body portion and the second body portion, and reduce the loose possibility of the connection position. The mechanical connection includes but is not limited to bolting, riveting, and snapping. At least the first body portion uses carbon fiber material body, which can increase the strength of the boom and reduce the weight of the boom, thereby reducing the power required to drive the boom and facilitating energy savings.

In any one of the above-mentioned embodiments, the boom further comprises a first connecting portion detachably connected to one end of the body; and a second connecting portion detachably connected to another end of the body, wherein, the first connecting portion is overlapped with the first body portion and/or the second body portion, and the second connecting portion is overlapped with the first body portion and/or the second body portion.

In this embodiment, the first connecting portion and the second connecting portion are detachably connected to the body, so that the first connecting portion and the second connecting portion with a complicated structure are made of different materials from the body. In case of failure or damage of the first connecting portion and the second connecting portion, it is only necessary to replace the damaged first connecting portion or second connecting portion, and it is not necessary to repair or replace the entire boom, so as to improve the convenience of maintenance and repair of the boom. The force situation of the first connecting portion and the second connecting portion is complicated, and the structure thereof is also relatively complicated; accordingly, the thermal deformation situation thereof is also relatively complicated, and the removable connection manner of the body is also beneficial to reduce the transmission of the force thereof to the body, thereby reducing the deformation of the body. The first connecting portion is overlapped with the first body portion and/or the second body portion, and the second connecting portion is overlapped with the first body portion and/or the second body portion, that is, the first connecting portion and the body, and the second connecting portion and the body are also connected in an overlapping manner. In this way, even if the materials of the first connecting portion and the body, and the second connecting portion and the body are different, the connection can be effectively performed, and the flexibility and convenience in selecting the materials of the first connecting portion and the second connecting portion are improved.

In the above-mentioned embodiment, the first connecting portion and the first body portion and/or the second body portion are connected by a mechanical connection and/or an adhesive connection, the second connection portion and the first body portion and/or the second body portion are connected by a mechanical connection and/or an adhesive connection.

In this embodiment, the means of mechanical connection and/or adhesive connection facilitate the removable purpose between the first connecting portion and the body and the removable purpose between the second connecting portion and the body. The means of mechanical connection includes, but is not limited to, bolting, riveting, and snapping. It should be noted that the body comprises a first body portion and a second body portion. Therefore, the connection between the first connecting portion, the second connecting portion and the body can be a connection only with the first body portion of the body, a connection only with the second body portion of the body, or a connection with both the first body portion and the second body portion.

In the above-mentioned embodiment, the boom further comprises a support seat provided on the second connecting portion and provided with a connecting hole, at least one of the first connecting portions, the second connecting portion and the support seat is a steel body.

In this embodiment, the support seat supports the boom, and the force thereof is also complicated, and therefore it is arranged on the second connecting portion for replacement with the second connecting portion in case of failure or damage, which is easy to maintain without replacing the entire boom. The support seat is provided with a connecting hole, so as to facilitate the connection with the support structure on the work machine via the connecting hole and fasteners, that is, the connection manner can use a mechanical connection, so that the support seat can use a material body different from the boom and the support structure, and the connection process without the need for thermal processing, so that the support seat and the boom are not easy to deform. The connection of the connecting hole also facilitates rotation of the support seat about the connecting hole and the fasteners in the connecting hole to increase the motion range of the boom. By setting at least one of the first connecting portion, the second connecting portion and the support seat as steel body, it is advantageous to ensure the strength of the first connecting portion or the second connecting portion or the support seat, thereby ensuring the operation reliability of the first connecting portion, the second connecting portion and the support seat. On the other hand, the steel raw materials are easy to be obtained, easy to be mass-produced, easy to be exchanged with the existing boom, and have good versatility, which is beneficial to saving components and materials and reducing waste.

An embodiment of the second aspect of the present disclosure provides a boom assembly, comprising a plurality of sections of a first boom hinged to each other, wherein at least one section of the first boom is the boom according to any one of the embodiments in the first aspect.

In this embodiment, by using the boom of any one of the above-mentioned embodiments, all the advantageous effects of the above-mentioned embodiments are obtained, and will not be described in detail herein. The first boom hinged to each other facilitates rotation and extends the working range of the boom assembly in all directions of length, width and height.

An embodiment of the third aspect of the present disclosure provides a work machine, comprising: a boom support structure; the boom according to any one of above-mentioned embodiments of the first aspect connected to the boom support structure; or the boom assembly according to any one of the above-mentioned embodiments in the second aspect connected to the boom support structure.

In this embodiment, all the advantageous effects of any one of the embodiments according to the first aspect are provided by using the boom of any one of the embodiments according to the first aspect, which will not be described in detail herein. By using the boom assembly of any one of the embodiments according to the second aspect, all the advantageous effects of any one of the embodiments according to the second aspect are achieved, and will not be described in detail herein. By setting the boom support structure, it is convenient to provide support for the boom or the boom assembly, which is beneficial to ensure the stability and reliability of the operation of the boom.

Additional aspects and advantages of the present disclosure will become apparent in the following description or will be learned by practice of the present disclosure.

Figure 1:
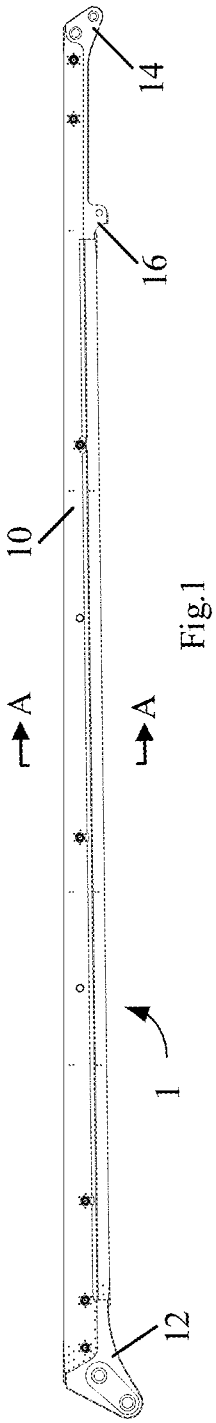
FIG. 1 is a structure schematic diagram of main view of a boom according to an embodiment of the present disclosure.

Wherein the correspondence between the reference numbers and the part names in FIGS. 1 to 11 is as follows:

1: boom; 10: body; 100: first body portion; 1000: first horizontal plate; 1002: first side plate; 1004: second side plate; 102: second body portion; 1020: second horizontal plate; 1022: third side plate; 1024: fourth side plate; 104: limiting portion; 1040: overlapping step; 1042: overlapping plate; 12: first connecting portion; 120: mounting hole; 14: second connecting portion; 16: support seat; 160: connecting hole; 2: boom assembly; 20: first boom; 3: work machine; 30: boom support structure.

DETAILED DESCRIPTION OF THE DISCLOSURE

In order that the above-mentioned objectives, features and advantages of the present disclosure can be understood more clearly, a further detailed description of the present disclosure will be given below in connection with the accompanying drawings and specific embodiments. It should be noted that the embodiments of the present disclosure and the features in the embodiments can be combined with each other if there is no conflict.

In the following description, numerous specific details are set forth in order to provide a thorough understanding of the present disclosure. However, the present disclosure can also be implemented in other manners than those described herein. Therefore, the protection scope of the present disclosure is not limited to the specific embodiments disclosed below.

Some embodiments of the present disclosure are described below with reference to FIGS. 1 to 11.

As shown in FIGS. 1 to 5, an embodiment of the present disclosure provides a boom 1, comprising a box-type structure, wherein the boom 1 comprises: a body 10 comprising a first body portion 100 and a second body portion 102, the first body portion 100 and the second body portion 102 enclosing to form the box-type structure, wherein, the first body portion 100 and the second body portion 102 overlap each other.

In this embodiment, the first body portion 100 and the second body portion 102 overlap each other, that is, the first body portion 100 and the second body portion 102 are of a split structure. The two are connected together in an overlapping manner, the first body portion 100 and the second body portion 102 may be formed separately and then assembled together. The split structure is beneficial to greatly simplify the mold for production and improve the versatility of the mold. When the structure of the boom is changed, it is not necessary to adjust the mold every time, which is beneficial to shorten the development time and improve the production efficiency in the early stage, and facilitate the batch production of the boom. In addition, when damage such as knock occurs to one of the first body portion 100 and the second body portion 102 using the split structure, only one of the damaged body needs to be replaced, and not all of the body 10 needs to be replaced, which is advantageous in saving materials and reducing waste.

Furthermore, the first body portion 100 and the second body portion 102 overlap each other, which is advantageous in that they can be fixed by means of mechanical connection or the like without heat processing. That is, when the first body portion 100 and the second body portion 102 are fixedly connected to each other, there is no thermal processing, and it is advantageous to reduce thermal deformation or high-temperature damage of both. Therefore, the first body portion and the second body portion can use a relatively light and thin structure corresponding to the connection mode of the non-thermal processing, thereby facilitating the weight reduction of the boom and achieving the purpose of light weight reduction of the boom. The overlapping manner also allows the first body portion 100 and the second body portion 102 to have a small amount of inconsistent deformation, that is, different material bodies can be used for the first body portion 100 and the second body portion 102, which is beneficial to improve the convenience of material selection for the first body portion 100 and the second body portion 102.

Figure 2:
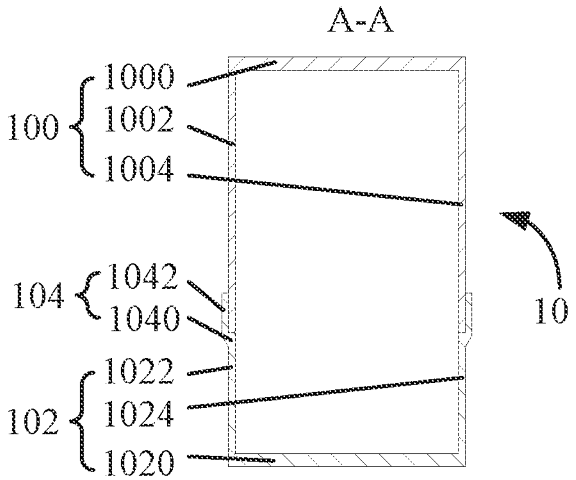
FIG. 2 is a structure schematic diagram of sectional view in A-A direction in FIG. 1.

As shown in FIG. 2, in the above-mentioned embodiments, both sides of the second body portion 102 are provided with a limiting portion 104, and the first body portion 100 and the second body portion 102 abut through the limiting portion 104.

In particular, the first body portion 100 comprises a first horizontal plate 1000, a first side plate 1002 and a second side plate 1004 which are integrally formed, the first side plate 1002 and the second side plate 1004 are respectively located at two sides of the first horizontal plate 1000, the first side plate 1002, the first horizontal plate 1000, and the second side plate 1004 form a U-shaped structure, and the second body portion 102 comprises a second horizontal plate 1020, a third side plate 1022 and a fourth side plate 1024 which are integrally formed, the third side plate 1022 and the fourth side plate 1024 are respectively located at two sides of the second horizontal plate 1020, and the third side plate 1022, the second horizontal plate 1020 and the fourth side plate 1024 form a U-shaped structure, wherein, the first side plate 1002 and the third side plate 1022 overlap each other, the second side plate 1004 and the fourth side plate 1024 overlap each other. One limiting portion 104 is provided on both sides of the second body portion 102, that is, the third side plate 1022 and the fourth side plate 1024, respectively.

Furthermore, the third side plate 1022 and the fourth side plate 1024 are respectively provided with the limiting portion 104, and the limiting portion 104 comprises an overlapping step 1040 and an overlapping plate 1042, the overlapping step 1040 of the third side plate 1022 abuts the first side plate 1002, the overlapping step 1040 of the fourth side plate 1024 abuts the second side plate 1004, the overlapping plate 1042 of the third side plate 1022 and the first side plate 1002 overlap each other, and the overlapping plate 1042 of the fourth side plate 1024 and the second side plate 1004 overlap each other.

In this embodiment, the first body portion 100 and the second body portion 102 are abutted by the limiting portion 104, so that the overlapping length of the two can be stably and reliably limited. That is, when overlapping is performed, the overlapping length of the two is fixed by the limiting action of the limiting portion 104, and at which position the overlapping step 1040 of the limiting portion 104 is set, the overlapping length can be brought to which position. The limiting portion 104 can also play a role of positioning. When the first body portion 100 and the second body portion 102 are connected by bolting, riveting, etc., positioning is performed through the limiting portion 104, so as to facilitate the alignment of hole positions and save assembly time. In addition, the limiting portion can also reduce the shearing force on the first body portion 100 and the second body portion 102, so as to improve the stability and reliability of both operations.

As shown in FIG. 2, more specifically, the first body portion 100 and the second body portion 102 have a U-shaped cross-section, respectively. During assembly, the U-shaped first body portion 100 and the U-shaped second body portion 102 are interlocked and lapped to form a box-shaped body 10. This is convenient to manufacture and assemble, and has high assembly efficiency, and when one of the first body portion 100 and the second body portion 102 is damaged, the damaged one can be replaced.

Figure 9:
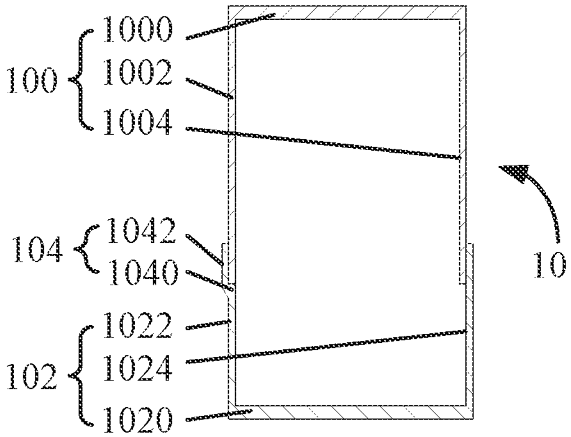
FIG. 9 is a structure schematic diagram of sectional view of a boom body according to an embodiment of the present disclosure.

As shown in FIG. 9, in other embodiments, only one side of the second body portion 102 is provided with a limiting portion 104, that is, only the third side plate 1022 of the second body portion 102 is provided with a limiting portion 104.

Figure 10:
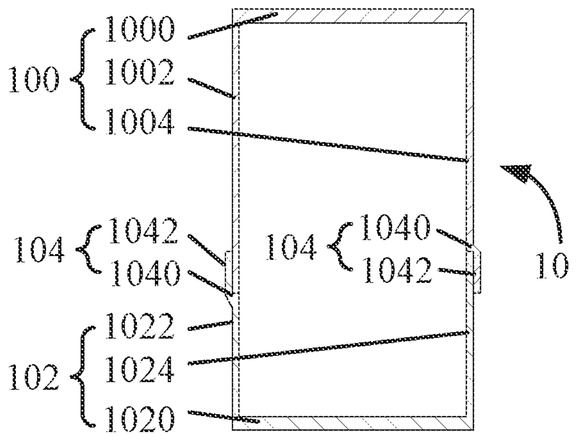
FIG. 10 is a structure schematic diagram of sectional view of a boom body according to an embodiment of the present disclosure.

As shown in FIG. 10, in further other embodiments, one side of the first body portion 100 and one side of the second body portion 102 are respectively provided with a limiting portion 104. Specifically, the second side plate 1004 of the first body portion 100 is provided with a limiting portion 104, and the third side plate 1022 of the second body portion 102 is provided with a limiting portion 104.

As shown in FIGS. 9 and 10, the overlapping plate 1042 of the limiting portion 104 on the third side plate 1022 and the third side plate 1022 are not coplanar, but are parallel to each other.

Figure 11:
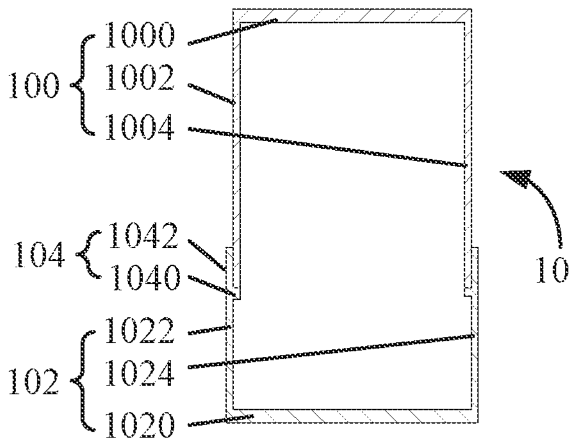
FIG. 11 is a structure schematic diagram of sectional view of a boom body according to an embodiment of the present disclosure.

As shown in FIG. 11, in some embodiments, the overlapping plate 1042 of the limiting portion 104 is coplanar with the corresponding side plate, for example, the overlapping plate 1042 on the limiting portion 104 of the third side plate 1022 is coplanar with the third side plate 1022 itself. The overlapping step 1040 projects from one side of corresponding side plate to another side, resembling a protruding platform.

In any one of the above-mentioned embodiments, the first body portion 100 and the second body portion 102 are mechanically connected and bonded, and such a connection manner does not require heating; when connecting and fixing, there is no high temperature, and the first connecting portion 12 and the second connecting portion 14 are not thermally deformed, which is advantageous for the first body portion 100 and the second body portion 102 to use a relatively light and thin structure, thereby achieving the purpose of light weight of the body 10. Furthermore, the simultaneous use of mechanical connection and adhesive connection, can achieve the purpose of being removable between the first connecting portion 12 and the second body portion 102, so that in case of damage, it is easy to replace and maintain, avoiding the replacement of all the body 10, which is beneficial to saving materials. The mechanical connection includes but is not limited to bolting, riveting, and snapping.

In any one of the above-mentioned embodiments, the first body portion 100 uses carbon fiber material body which can increase the strength of the boom 1 and reduce the weight of the boom 1, thereby reducing the power required to drive the boom 1 and facilitating energy savings.

In some embodiments, the first body portion 100 and the second body portion 102, that is, the body 10 is entirely made of carbon fiber material body. The body 10 is all made of carbon fiber material body, the first body portion 100 and the second body portion 102 are unified, and the properties thereof are the same in all aspects, especially the thermal deformation properties are the same. In the case of large temperature difference in working environment, it is beneficial to avoid the phenomenon of inconsistent thermal deformation, reduce the pre-stress in the body 10 of the boom 1, and improve the use safety of the boom 1.

Figure 3:
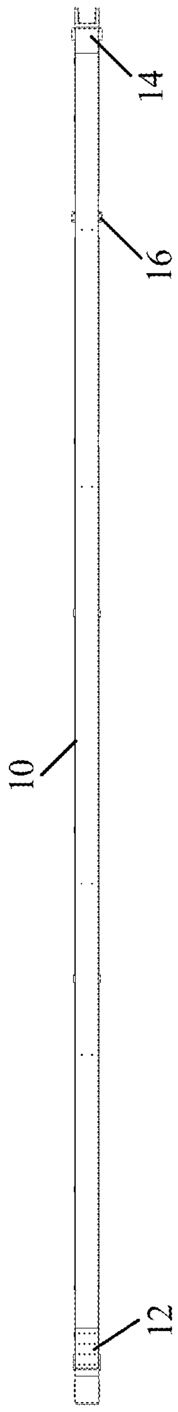
FIG. 3 is a structure schematic diagram of top view of a boom according to an embodiment of the present disclosure.

As shown in FIG. 3, in any one of the above-mentioned embodiments, the boom 1 further comprises a first connecting portion 12 and a second connecting portion 14. The first connecting portion 12 is removably connected to one end of the body 10. The second connecting portion 14 is removably connected to another end of the body 10. The first connecting portion 12 and the second connecting portion 14 have a complicated structure and can be made of materials different from those of the body 10 in a detachable connection manner. In case of failure or damage of the first connecting portion 12 and the second connecting portion 14, it is only necessary to replace the damaged first connecting portion 12 or second connecting portion 14, and it is not necessary to repair or replace the entire boom 1, so as to improve the convenience of maintenance and repair of the boom 1. The force situation of the first connecting portion 12 and the second connecting portion 14 is complicated, and the structure thereof is also relatively complicated; accordingly, the thermal deformation situation thereof is also relatively complicated, and the removable connection manner with the body 10 is also beneficial to reduce the transmission of the force thereof to the body 10, thereby reducing the deformation of the body 10.

Furthermore, the first connecting portion 12 and the body 10 overlap each other. The second connecting portion 14 and the body 10 overlap each other.

In some embodiments, the first connecting portion 12 and the first body portion 100 overlap each other, and the first connecting portion 12 and the first body portion 100 are fixedly connected by means of mechanical connection and adhesive connection. The second connecting portion 14 and the first body portion 100 overlap each other, and the second connecting portion 14 and the first body portion 100 are fixedly connected by means of mechanical connection and adhesive connection.

In other embodiments, the first connecting portion 12 and the second body portion 102 overlap each other; the first connecting portion 12 and the second body portion 102 are fixedly connected by means of mechanical connection and adhesive connection. The second connecting portion 14 and the second body portion 102 overlap each other; the second connecting portion 14 and the second body portion 102 are fixedly connected by means of mechanical connection and adhesive connection.

In other embodiments, the first connecting portion 12 and the first body portion 100 are overlapped with the second body portion 102; the first connecting portion 12 and the first body portion 100 are fixedly connected with the second body portion 102 by means of mechanical connection and adhesive connection. The second connecting portion 14 and the first body portion 100 are overlapped with the second body portion 102; the second connecting portion 14 and the first body portion 100 are fixedly connected with the second body portion 102 by means of mechanical connection and adhesive connection.

In other embodiments, the first connecting portion 12 and the first body portion 100 are overlapped with the second body portion 102; the first connecting portion 12 and the first body portion 100 are fixedly connected with the second body portion 102 by means of mechanical connection and adhesive connection. The second connecting portion 14 and the first body portion 100 overlap each other; the second connecting portion 14 and the first body portion 100 are fixedly connected by means of mechanical connection and adhesive connection.

In further other embodiments, first connecting portion 12 and the first body portion 100 are overlapped with the second body portion 102, the first connecting portion 12 and the first body portion 100 are fixedly connected by means of mechanical connection; the first connecting portion 12 and the second body portion 102 are fixedly connected by means of adhesive connection. The second connecting portion 14 are overlapped with the first body portion 100 and the second body portion 102, the second connecting portion 14 and the first body portion 100 are fixedly connected by means of mechanical connection, the second connecting portion 14 and the second body portion 102 are fixedly connected by means of adhesive connection.

Figure 5:
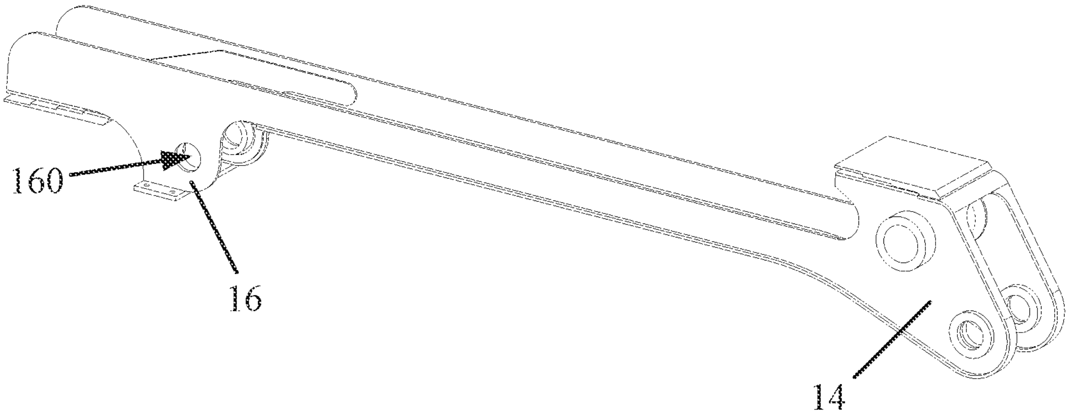
FIG. 5 is a three-dimensional structure schematic diagram of a second connecting portion of a boom according to an embodiment of the present disclosure.

As shown in FIG. 5, in the above-mentioned embodiments, the boom further comprises a support seat 16 provided on the second connecting portion 14 and provided with a connecting hole 160 to facilitate the connection with the support structure on the work machine, at least one of the first connecting portion 12, the second connecting portion 14 and the support seat 16 is a steel body.

In this embodiment, the support seat 16 supports the boom 1, and the force thereof is also complicated, and therefore it is arranged on the second connecting portion 14 for replacement with the second connecting portion 14 in case of failure or damage, which is easy to maintain without replacing the entire boom 1. By setting at least one of the first connecting portion 14, the second connecting portion 14 and the support seat 16 as steel body, it is advantageous to ensure the strength of the first connecting portion or the second connecting portion or the support seat, thereby ensuring the operation reliability of the first connecting portion 12, the second connecting portion 14 and the support seat 16. On the other hand, the steel raw materials are easy to be obtained, easy to be mass-produced, easy to be exchanged with the existing boom 1, and have good versatility, which is beneficial to saving components and materials and reducing waste.

In some embodiments, the support seat 16 is connected to the hydraulic cylinder via the connecting hole 160 and a fastener, which may also be referred to as a cylinder base; through the connection with the hydraulic cylinder, the boom 1 can be easily lifted or lowered through the extension and shortening of the hydraulic cylinder.

Figure 6:
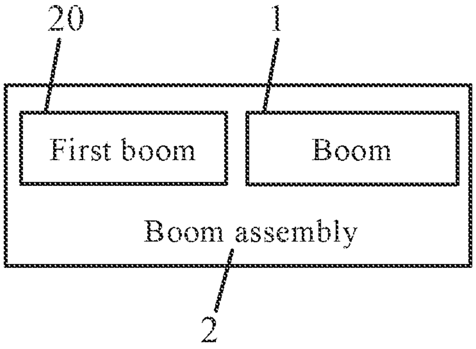
FIG. 6 is a structure schematic block diagram of a boom assembly according to an embodiment of the present disclosure.

As shown in FIG. 6, an embodiment of the second aspect of the present disclosure provide a boom assembly 2, comprising a plurality of sections of a first boom 20 hinged to each other, wherein at least one section of the first boom 20 is the boom 1 according to any one of the embodiments in the first aspect.

In this embodiment, by using the boom 1 of any one of the above-mentioned embodiments, all the advantageous effects of the above-mentioned embodiment are obtained, and will not be described in detail herein. The first boom 1 hinged to each other facilitates rotation and extends the working range of the boom assembly 2 in all directions of length, width and height.

In some embodiments, the first boom 20 is all booms 1. In other embodiments, in the plurality of sections of the first boom 20, only a part of them is boom 1.

Figure 7:
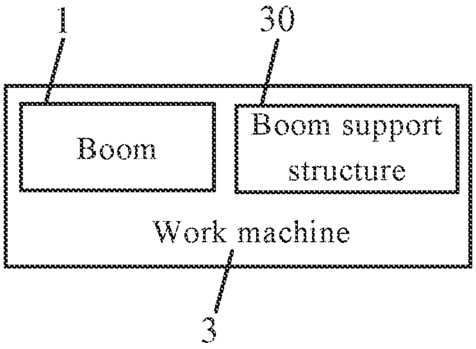
FIG. 7 is a structure schematic block diagram of a work machine according to an embodiment of the present disclosure.
Figure 8:
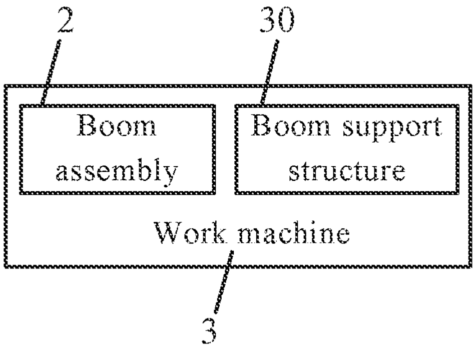
FIG. 8 is a structure schematic block diagram of a work machine according to an embodiment of the present disclosure.

As shown in FIG. 7, an embodiment of the third aspect of the present disclosure provides a work machine 3, comprising: a boom support structure 30; the boom 1 according to any one of above-mentioned embodiments of the first aspect connected to the boom support structure 30. As shown in FIG. 8, the boom assembly 2 according to any one of the above-mentioned embodiments in the second aspect connected to the boom support structure 30.

In this embodiment, all the advantageous effects of any one of the embodiments according to the first aspect are provided by using the boom 1 of any one of the embodiments according to the first aspect, which will not be described in detail herein. By using the boom assembly 2 of any one of the embodiments according to the second aspect, all the advantageous effects of any one of the embodiments according to the second aspect are achieved, and will not be described in detail herein. By setting the boom support structure 30, it is convenient to provide support for the boom 1 or the boom assembly 2, which is beneficial to ensure the stability and reliability of the operation of the boom 1.

The work machine 3 includes at least concrete pump truck, crane and fire truck.

In some embodiments, the boom support structure 30 comprises a base provided on the body of the concrete pump truck, and the base is connected to the first connecting portion 12 of the boom 1.

In other embodiments, the boom support structure 30 comprises a hydraulic oil cylinder arranged on the body of the concrete pump truck, and the hydraulic oil cylinder is connected to the support seat 16 of the boom 1; in this case, the support seat 16 is an oil cylinder seat.

According to the boom 1 provided by an embodiment of the present disclosure, the embodiment is as follows:

1) The large head, small head and cylinder seat portion at both ends of the boom 1 uses steel structure.
2) The middle box of the boom 1 uses pure carbon fiber structure without carbon+aluminum structure.
3) The steel structure and the carbon fiber structure are connected by mechanical connection+glue joint.

Figure 4:
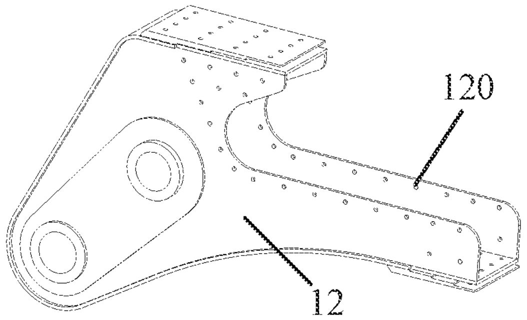
FIG. 4 is a three-dimensional structure schematic diagram of a first connecting portion of a boom according to an embodiment of the present disclosure.

As shown in FIGS. 1 and 3, it can be understood that the first connecting portion 12 of the boom 1 is a large head end, and the second connecting portion 14 of the boom 1 is a small head end. The body 10 of the boom 1 is a middle box. As shown in FIGS. 4 and 5, a plurality of mounting holes 120 are respectively provided on the large head end and the small head end, to facilitate mechanical connection with the middle box body or the body 10; the body 10 all use carbon fiber material body. As shown in FIG. 3, the body 10 comprise an upper U-shaped carbon groove (the first body portion 100) and a lower U-shaped carbon groove (the second body portion 102) which are snap-fitted and overlapped to form a box body structure; the oil cylinder seat is arranged on the small head end and the large head end, the small head end, the large head end and the oil cylinder seat are all steel structures.

It should be noted that in this embodiment, the support seat 16 is a cylinder seat, but the support seat 16 is not limited to being a cylinder seat.

The advantages of this embodiment are as follows:

1) The large head end, the small head end and the oil cylinder seat portion of the boom uses steel structure, which can be interchanged with existing steel boom and has good universality, and the steel structure has been fully verified and high reliability.
2) The middle box of the boom uses pure carbon fiber structure (without carbon+aluminum structure), which can avoid the inconsistent thermal deformation.
3) The steel structure and the carbon fiber structure through mechanical connection+bonding, the assembled structure is conducive to the later failure maintenance, but also conducive to mass production, and ultimately achieve the purpose of lightweight design of the boom.

In other embodiments, the central box-type structure (the body 10) of the boom can be formed in other configurations, for example by joining four panels of the carbon fiber material body.

The embodiment of the present disclosure is illustrated in detail above in conjunction with the accompanying drawings, according to the technical scheme of the present disclosure, while realizing the lightweight design of the boom, the split structure design is adopted, which is beneficial to simplify the mold of the boom body, improve the versatility of the mold, improve the inconsistent thermal deformation of the boom, and facilitate the later maintenance.

In the present disclosure, the terms “first”, “second”, and “third” are used for the purpose of description only, and cannot be understood as indicating or implying relative importance; and the term "plurality" means two or more, unless otherwise expressly defined. The terms "installing", "connected", "connection", "fixing" and the like should be understood in a broad sense. For example, "connection" may be a fixed connection, a removable connection or an integral connection; and "connected" may refer to direct connection or indirect connection through an intermediary. A person of ordinary skills in the art could understand the specific meaning of the terms in the present disclosure according to specific situations.

In the description of the present disclosure, it should be understood that the orientation or position relationships indicated by the terms "upper", "lower", "left", "right", "front", "back" and the like are the orientation or position relationships based on what is shown in the drawings, are merely for the convenience of describing the present disclosure and simplifying the description, and do not indicate or imply that the device or unit referred to must have a particular direction and is constructed and operated in a specific orientation, and thus cannot be understood as the limitation of the present disclosure.

In the description of the present specification, the descriptions of the terms "one embodiment", "some embodiments" and "specific embodiments" and the like mean that specific features, structures, materials or characteristics described in conjunction with the embodiment(s) or example(s) are included in at least one embodiment or example of the present disclosure. In the specification, the schematic representation of the above terms does not necessarily refer to the same embodiment or example. Moreover, the specific features, structures, materials or characteristics described may be combined in a suitable manner in any one or more embodiments or examples.

The descriptions above are only preferred embodiments of the present disclosure, which are not used to limit the present disclosure. For a person skilled in the art, the present disclosure may have various changes and variations. Any modifications, equivalent substitutions, improvements etc. within the spirit and principle of the present disclosure shall all be included in the protection scope of the present disclosure.

What is claimed is:

1. A boom comprising a box-type structure, wherein the boom comprises:

a body comprising a first body portion and a second body portion, the first body portion and the second body portion enclosing to form the box-type structure;

a first connecting portion detachably connected to one end of the body; and a second connecting portion detachably connected to another end of the body;

wherein the first connecting portion is overlapped with the first body portion and/or the second body portion, and the second connecting portion is overlapped with the first body portion and/or the second body portion;

wherein the first body portion and the second body portion overlap each other;

wherein the first body portion comprises a first horizontal plate, a first side plate and a second side plate which are integrally formed, the first side plate and the second side plate are respectively located at two sides of the first horizontal plate, and the first side plate, the first horizontal plate and the second side plate form a first U-shaped structure;

wherein the second body portion comprises a second horizontal plate, a third side plate and a fourth side plate which are integrally formed, the third side plate and the fourth side plate are respectively located at two sides of the second horizontal plate, and the third side plate, the second horizontal plate and the fourth side plate form a second U-shaped structure;

wherein the first side plate and the third side plate overlap each other, the second side plate and the fourth side plate overlap each other;

wherein at least one of the first side plate and the third side plate is provided with a limiting portion, and/or at least one of the second side plate and the fourth side plate is provided with a limiting portion;

wherein the first body portion and the second body portion are abutted via the limiting portion;

wherein the limiting portion comprises an overlapping step and an overlapping plate, the overlapping plate of the limiting portion is coplanar with the corresponding side plate, the overlapping step projects from one side of corresponding side plate to another side.

2. The boom according to claim 1, wherein the third side plate and the fourth side plate are respectively provided with the limiting portion, the overlapping step of the third side plate abuts the first side plate, the overlapping step of the fourth side plate abuts the second side plate, the overlapping plate of the third side plate and the first side plate overlap each other, and the overlapping plate of the fourth side plate and the second side plate overlap each other; and/or the second side plate and the third side plate are provided with the limiting portion, the overlapping step of the third side plate abuts the first side plate, the overlapping step of the second side plate abuts the fourth side plate, the overlapping plate of the third side plate and the first side plate overlap each other and the overlapping plate of the second side plate and the fourth side plate overlap each other.

3. The boom according to claim 1, wherein the first body portion and the second body portion are mechanically connected and bonded, and at least the first body portion is a carbon fiber material body.

4. The boom according to claim 1, wherein the first connecting portion and the first body portion and/or the second body portion are connected by a mechanical connection and/or an adhesive connection, the second connection portion and the first body portion and/or the second body portion are connected by a mechanical connection and/or an adhesive connection.

5. The boom according to claim 1, further comprising:

a support seat provided on the second connecting portion and provided with a connecting hole, at least one of the first connecting portion, the second connecting portion and the support seat is a steel body.

6. A boom assembly, comprising a plurality of sections of a first boom hinged to each other, wherein at least one section of the first boom is the boom according to any one of claims 1, 2-3, and 4-5.

7. A work machine, comprising:

a boom support structure;

the boom according to any one of claims 1, 2-3, and 4-5 connected to the boom support structure.

8. A work machine, comprising:

a boom support structure;

the boom assembly according to claim 6 connected to the boom support structure.

* * * * *